Jan. 4, 1955 S. I. TOURSHOU 2,698,903

BEAM DEFLECTION CONTROL FOR CATHODE-RAY DEVICES

Filed Dec. 30, 1949 2 Sheets-Sheet 1

INVENTOR
Simeon I. Tourshou
BY
George T. Craig
ATTORNEY

Jan. 4, 1955 S. I. TOURSHOU 2,698,903

BEAM DEFLECTION CONTROL FOR CATHODE-RAY DEVICES

Filed Dec. 30, 1949 2 Sheets-Sheet 2

INVENTOR
Simeon I. Tourshou
BY
George T. Craig
ATTORNEY

United States Patent Office 2,698,903

Patented Jan. 4, 1955

2,698,903

BEAM DEFLECTION CONTROL FOR CATHODE-RAY DEVICES

Simeon I. Tourshou, Philadelphia, Pa., assignor to Radio Corporation of America, a corporation of Delaware Application December 30, 1949, Serial No. 136,021

7 Claims. (Cl. 250—36)

The present invention relates to means for controlling the frequency of an oscillator, and, more particularly, but not necessarily exclusively, to novel means for synchronizing the scanning deflection in cathode ray beam apparatus, such, for example, as a cathode ray tube, whereby greater stability and noise immunity is obtained and the pull-in range of the system is improved.

In accordance with the invention, a control tube, having novel circuit connections, is provided for controlling the frequency of an oscillator. Grid bias for the control tube is obtained in a novel manner from its cathode circuit. Also, in accordance with the invention, a voltage wave is obtained from the oscillator in a novel manner to provide a special wave form which is combined with a series of control signals. In the illustrative example these control signals are the usual television sync signals. The output of the control tube is filtered in a manner which is novel with respect to the voltage wave form which is obtained from the oscillator and this output is applied to the oscillator to control its frequency of oscillation whereby the oscillator frequency is substantially independent of noise voltages unavoidably mixed with the sync signals.

The principal object of the present invention is to provide apparatus embodying novel control tube connections for controlling the operation of an oscillator in accordance with a series of control signals.

Another object is to provide novel means for obtaining a biasing voltage for the grid of the control tube.

A further object of the invention is to provide a novel arrangement for obtaining a signal for application to a phase comparison device, such as a control tube, which provides a signal for controlling the operation of a deflection oscillator.

A still further object is to provide novel means for obtaining a signal for application to one of the elements of the control tube in combination with novel means for obtaining a control voltage from the control tube to be applied to a deflection oscillator for synchronizing its frequency with the frequency of a series of controlling signals.

Figures 1, 4:
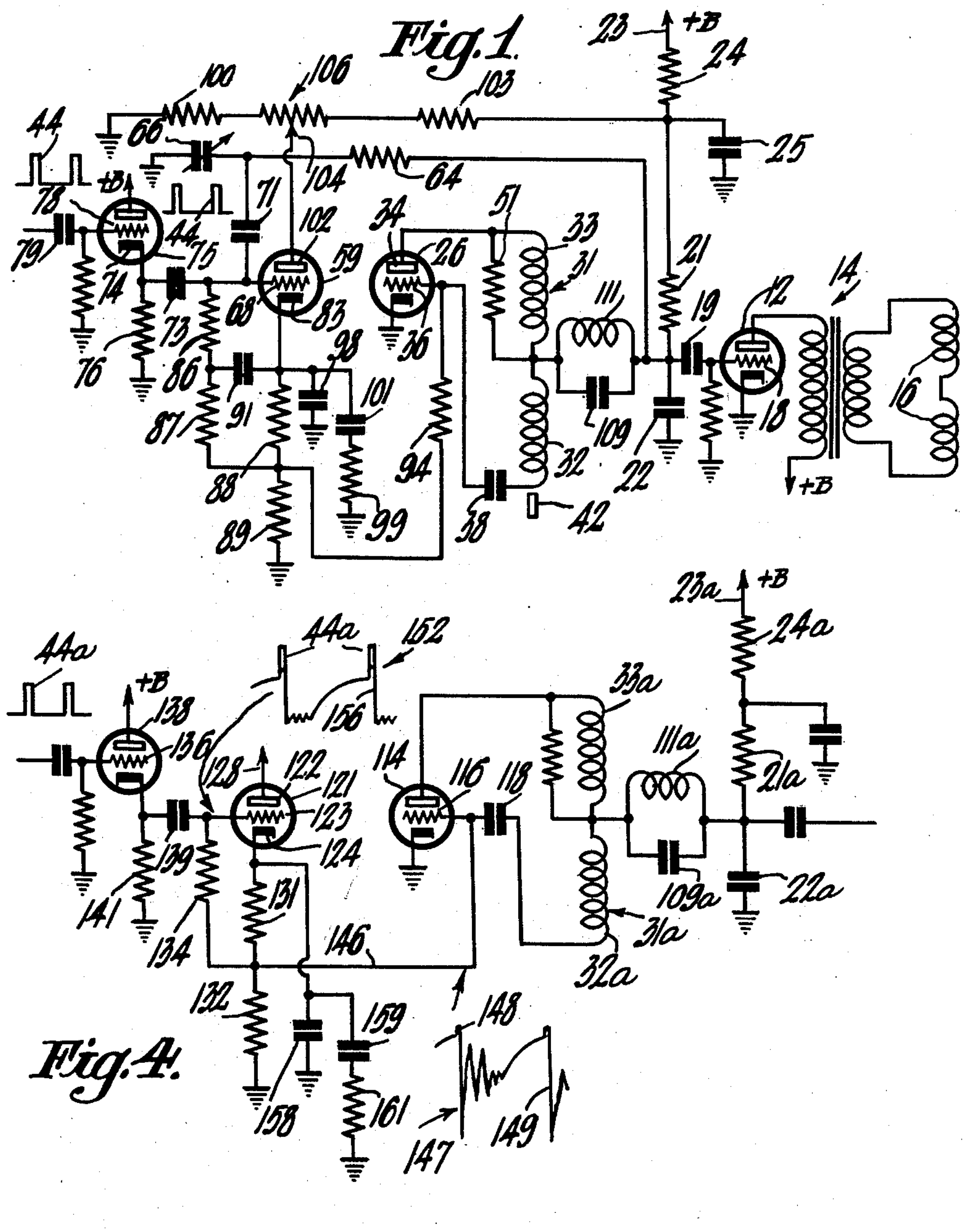
Figure 2A:
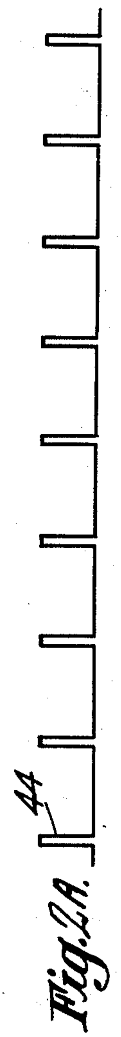
Figure 2B:
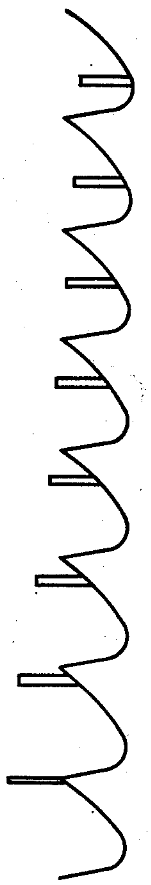
Figure 2C:
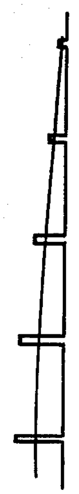
Figure 3A:
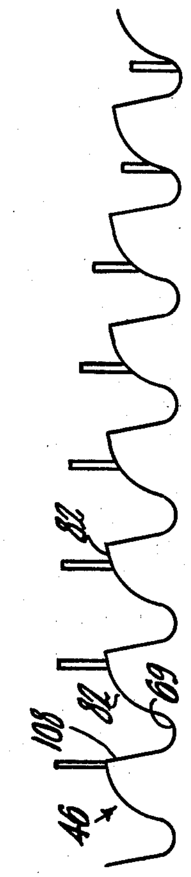
Figure 3B:
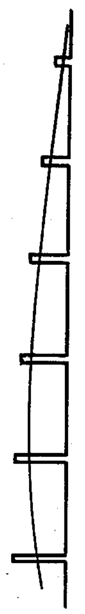

Other objects and advantages of the present invention will, of course, become apparent and immediately suggest themselves to those skilled in the art to which the invention is directed from a reading of the following specification in connection with the accompanying drawings in which:

Fig. 1 shows, diagrammatically, a portion of a television receiver embodying the present invention;

Figs. 2A, 2B and 2C indicate the manner in which apparatus not embodying the present improvements functions to restore synchronism between the output wave forming oscillator and an incoming series of signals;

Figs. 3A and 3B are similar to 2B and 2C but illustrate the functioning of apparatus embodying the present invention; and Fig. 4 is a schematic showing of the circuits of a portion of a television receiver involving another embodiment of the present invention.

Referring to Fig. 1 of the drawing, there is shown by way of example, a deflection circuit for deflecting the cathode ray beam of a cathode ray tube (not shown) in one direction, for example, the horizontal direction. Another similar deflection circuit (not shown) may be employed to produce deflection in another direction substantially at right angles to the first direction thereby to produce a scanned raster in a well known manner. Known deflection wave form generating circuits, generally similar to that shown herein by way of example, are disclosed in U. S. Patent No. 2,101,520, granted December 7, 1937, to W. A. Tolson and Tolson Reissue Patent No. Re. 20,338 dated April 30, 1937.

The deflection circuit selected by way of example as a setting for the present invention, although the invention is not limited in use to circuits of this type, comprises a power tube 12, a deflection transformer 14, and a deflection coil or coils 16. The coils 16 may be incorporated in a deflection yoke for use with a cathode ray tube (neither shown). It will be understood that a damper tube (not shown) is usually provided for a purpose which is by now well known and may, for example, be of the type disclosed in U. S. patent to Schade No. 2,309,672, granted February 2, 1943, which shows a damper tube in the plate circuit of the scanning output tube. Suitable centering means (not shown), such as are well known in the art, may be incorporated as desired in the circuit which supplies deflection current to the coils 16. Inasmuch as the power tube 12 and the parts so far described may be conventional, they need not be described further herein.

The grid 18 of the power tube 12 is connected through suitable coupling means, shown as a condenser 19, to a resistor and condenser combination 21 and 22. The condenser 22 is connected to a suitable source of positive potential (not shown) through the resistor 21 which serves as a charging resistor. The voltage supply source may be the usual "B+" or anode supply source generally associated with electronic equipment. The point of connection to the positive source is indicated as the terminal 23 and a resistor 24 is included in series with the resistor 21 to provide proper voltage for the supply connection. A smoothing condenser 25 is included in the supply circuit. The condenser 22 is charged through the resistor 21 and is discharged when a tube 26, which is provided with circuit connections so that it will serve as a blocking oscillator, becomes conductive.

The blocking oscillator connections referred to above include a single coil 31 which may be regarded as an autotransformer having a primary or grid section 32 and a secondary or plate section 33. The plate section is connected to the anode 34 of the discharge tube 26 and the grid 36 of this tube is connected through a capacitor 38 to the end of the grid section 32. The movable core 42, of powdered iron for example, may be associated in the flux path of the coil 31 in the manner described in the copending application of the present inventor for United States patent for Beam Deflection Control, Serial No. 783,303, filed October 31, 1947, now Patent No. 2,633,538 granted March 31, 1953. Sync pulses 44 (Figs. 1 and 2A), generated or derived in any manner which is by now well known to those skilled in the art, are combined with the wave form of voltage indicated conventionally at 46, as shown by Fig. 3A, in a manner determined by changes in operating conditions of the apparatus. A resistor 51 is connected across the plate section 33 of the coil 31, or at least a portion thereof, to serve as a damping resistor. The manner in which the pulses 44 and the wave 46 are employed to control the oscillator 26 will be described hereinafter in detail in connection with Figs. 3A and 3B of the drawing.

During the charge cycles of the capacitor 22, the charging curve is substantially linear, initially. The tube 26 is blocked by a charge on the capacitor 38 which holds the grid 36 negative. This charge on the capacitor 38 leaks off at a rate controlled by a control tube 59 in a manner to be described until the conduction point of the tube 26 is reached. When the conduction point is reached the grid voltage is raised immediately and increases due to transformer action. The capacitor 22 is discharged through the tube 26. Following this, the grid is driven abruptly negative, the negative charge for this purpose being as indicated, stored in the capacitor 38. The rate of discharge of the capacitor 38 is controllable by a voltage derived with the aid of the control tube 59 as a result of the comparison between the wave 46 (Fig. 3A) which is derived from the blocking oscillator 26 and the incoming sync pulses 44. The wave 46 is a modification of the wave developed in operation of the blocking oscillator by the resistor 21 and the condenser 22 which function to produce a sawtooth of voltage as the condenser 22 charges up and is discharged when the tube 26 becomes conductive periodically. A resistor 64 in series with a condenser 66 serves partially to integrate the sawtooth of voltage. The condenser 66 is relatively small. This capacity value of the condenser 66 is chosen so that the portion 69 (Fig. 3A) of each cycle of the wave does not change abruptly but is rounded so that each cycle of the wave 46 is a modified parabolic wave as it appears at the junction of the resistor 64 and the condenser 66. A condenser 71 couples the resistor 64 and the condenser 66 to the grid 68 of the control tube 59. The path from the junction of the resistor 64 and the condenser 66 by way of the condenser 71 to ground, is completed by a coupling condenser 73 which serves to couple the cathode 74 of the cathode follower tube 75 to the grid 68 of the tube 59. The cathode resistor 76 for the tube 75 preferably has a relatively low value of resistance. The sync pulses 44 are applied to the grid 78 of the cathode follower tube 75 by any suitable coupling means such as a coupling condenser 79. The condenser 71 serves to flatten the crest of each cycle of the wave 46 as indicated by reference character 82 (Fig. 3A).

The D. C. connection of the grid 68 of the tube 59 to the cathode 83 includes resistors 86 and 87 and also the cathode resistor 88. The resistors 86 and 87 constitute the grid leak and this grid leak is tapped for a by-pass connection to the cathode, this connection in the illustrative example being the condenser 91. The cathode circuit is completed to ground through a resistor 89.

The oscillator grid leak 94 is connected to the cathode circuit of the tube 59 between the resistors 88 and 89. Filtering for the cathode circuit is provided by a condenser 98 shunted by a resistor and condenser combination 99 and 101. The filtering effect in the cathode circuit of the tube 59 may be made relatively large by employing the improvement of the present invention since the system has a relatively large pull-in range. This heavier filter gives better noise immunity and makes the system less susceptible to multi-path signals, vertical sync, or other causes of raster "bends" or distortion of the top of the raster or television image.

The anode 102 of the tube 59 is connected to the terminal 23 by way of the previously mentioned resistor 24, a resistor 103 and the movable tap 104 of a potentiometer 106. One end of the resistor of the potentiometer is grounded through a resistor 100 as indicated so that the resistors 103, 100 and the potentiometer 106 serve as a voltage divider with a variable voltage tap applied to the anode 102 for the purpose of obtaining a hold control.

The manner in which the invention operates to provide improved control of the oscillator 26 will now be described. As stated above, the sawtooth wave which is applied by the resistor 21 operating in combination with the condenser 22 is modified by partial integration provided by the resistor 64 and the variable condenser 66. The wave shape of this wave is such that a sufficient amount of the sharp front of the sawtooth gets through especially with the addition of the condenser 71 which means that the wave 46 shown by Fig. 3A of the drawings has a sharply decreasing portion 108. The sync signals 44 are applied to the grid 68 at the same time as the wave 46 so that current flow in the tube 59 is determined by the width of the sync pulse 44 which remains at each crest of the wave 46 in normal operation of the system. When the oscillator is fast wtih respect to its desired frequency, the effective width of the pulse 44 remaining on the crest of each cycle of the wave 46 is smaller. These plate current pulses are averaged by the filter comprising the condenser 98 and the resistor condenser combination 101 and 99. The rate of discharge of the grid condenser 38 is thus controlled by the voltage which appears at the point between the resistors 88 and 89. This voltage is less positive when the oscillator tends to operate at a higher frequency or is fast.

The resonant circuit comprising a condenser 109 and an inductor 111 develops a sine wave which combines with the sawtooth wave developed by the capacitor 22, and with the exponential discharge wave on the grid 36 of the oscillator tube 26. The grid voltage, therefore, approaches the firing point more abruptly near the normal firing point or bias level at which the oscillator will begin to repeat its cycle of operation. This will prevent an inadvertent rise in the grid voltage caused by noise, a change in tube circuit conditions, or from other causes. Therefore, the control exercised by the guiding or control signal applied from the point between the resistors 88 and 29 becomes predominant.

The grid 68 of the tube 59 is self-biased by means of the divided grid leak comprising the resistors 86 and 87 and the cathode resistor 88. The condenser 91, which effectively ties the grid return to the cathode for A. C., but not for D. C., nearly eliminates the A. C. degeneration, which otherwise would waste the increase in the pull-in range obtained in accordance with the present invention by the condenser 71 which provides the flattened portion 82 of each cycle of the wave 46. The D. C. degeneration increases the long time frequency stability of the circuit, since the aging of the tube is compensated by a change in its cathode bias; it also does reduce the hold range, but since the hold range is normally considerably greater than the pull-in range, this reduction is of no consequence.

It will be observed by examining Figs. 3A and 3B, which apply when the oscillator is running considerably slower than its desired frequency, that as the oscillator sweeps past sync before falling into synchronism, that a series of pulses of plate current are integrated into wide pulses whose width depends upon the shape of the wave 46. The flatter the top of the wave 46 the less the "gating" and the larger the number of pulses per sweep-by of the oscillator, therefore the larger the pull-in effect. In Fig. 3B it will be noted that six sync pulses are available to be integrated into a wide pulse by the filter for providing a pull-in effect on the grid of the blocking oscillator. In Figs. 2B and 2C, which show conditions without benefit of the improvements of the present invention, only four pulses are available each time the oscillator frequency and the sync frequency bear such a phase relationship that pulses are available in the cathode circuit of the tube 59 for pulling in the oscillator 26. In these figures the "gating" or cut-off point of the tube 59 is assumed to be the crest of each cycle of the wave 46.

Solely by way of example values will be given for certain of the components which are most closely concerned with the present invention. These values have been found effective in practice and their recitation herein is illustrative of the invention in one of its embodiments rather than restrictive. The resistor 64 may have a value of 150,000 ohms. The condenser 66 may have a value of 4 to 70 mmf. The condenser 71 may have a value of 82 mmf. The resistors 86 and 87 may have values of 330,000 ohms and 820,000 ohms, respectively. The resistor 88 may have a value of 82,000 ohms. The resistor 89 may have a value of 330,000 ohms. The condenser 98 may have a value of .022 mf. The condenser 101 may have a value of .47 mf. The resistor 99 may have a value of 3900 ohms. The condenser 73 may have a value of 82 mmf. The resistor 94 may have a value of 150,000 ohms. It will be understood that the values just given are approximate and represent a single embodiment of the invention when the tubes 26 and 59 are combined in the form of a 6SN7–GT.

Fig. 4 of the drawing shows another embodiment of the invention in a considerably simplified form which effects a saving in component parts at some sacrifice of pull-in range, for such applications as require less pull-in range. Referring to Fig. 4, it will be seen that the blocking oscillator is similar to that shown by Fig. 1. Its grid circuit has been modified in accordance with the embodiment of the invention presently under discussion. Parts which perform a similar function in Fig. 1 will be given the same reference character with the suffix "*a*" added. The resistor **24*a*, the resistor 21*a* and the condenser 22*a* serve the same purpose as the corresponding components in Fig. 1. The blocking oscillator tube 114 is provided with elements identical with or similar to those described with reference to Fig. 1 and the anode and grid are connected to a coil 31*a* which includes an anode section 33*a* and a grid section 32*a*. The connection between the grid section 32*a* of the coil 31*a* and the grid 116 of the tube 114 includes a grid condenser 118. A resonant circuit comprising a condenser 109*a* and an inductor 111*a* is connected between the coil 31*a* and the junction of the resistor 21*a* and the condenser 22*a***.

A control tube 121 is provided which comprises an anode 122, a grid 123 and a cathode 124. The anode 122 is connected to a suitable source of positive potential (not shown) by way of a terminal, schematically shown and designated 128. The voltage at the terminal 128 is preferably only a fraction of the positive voltage applied to the anode 102 of the tube 59 of Fig. 1. The source of positive voltage (not shown) for the entire system may be the same as that to which the terminal 23*a* is connected. Suitable means, such as a dropping resistor or potentiometer (neither shown) may be employed to obtain the desired voltage at the terminal 128. The cathode 124 is connected to a voltage reference point for the system, such, for example, as ground through resistors 131 and 132. The grid 123 is connected to the junction of the resistors 131 and 132 by way of a resistor 134.

Control signals 44*a*, which may be the usual television sync signals, are applied to the grid 136 of a tube 138 which is cathode coupled to the grid 123 of the tube 121 by coupling condenser 139. The cathode resistor 141 serves as the cathode follower resistor.

The junction of the resistors 131 and 132 is connected to the grid 116 of the oscillator tube 114 by a conductor 146. Not only does the conductor apply a wave derived from the oscillator to the circuits of the control tube 121, but it also supplies a control signal in the form of a control voltage from the control tube 121 to the oscillator. Reference character 147 indicates the wave form of voltage which appears on the grid 116 in operation of the oscillator 114. The wave form 147 includes a small positive peak 148 and an abrupt negative excursion 149. The oscillator is blocked between a negative excursion 149 and the next succeeding peak 148. However, some oscillations may occur as shown conventionally on the accompanying drawing. The wave form of voltage 152 appearing on the grid 123 of the tube 121 is the result of a combination of several effects in accordance with this aspect of the invention. The modification of the wave 147, which resembles a sawtooth of voltage, is effected by the resistor 134 and the condenser 139. This may be regarded as partial integration which results in rounding off of the negative peak of the wave 147. Sync pulses 44*a* ride on the crests of the wave 152 and the time duration of these pulses determines the value of the control voltage which is applied over the conductor 146 to control the frequency of the oscillator. When the oscillator frequency tends to be high, part of each successive pulse 44*a* appears as a distortion at or adjacent the bottom of the sharp wave front 156. The plate current flow of the tube 121 will then be at or near its minimum value. The filter, comprising the condenser 158 and the condenser and resistor combination 159 and 161, serves as a filter for the cathode circuit of the tube 121. In the embodiment of Fig. 4, the gating, or cutoff point of the tube 121 is set by the resistor 134 and the resistor 131. This tube is thus self-biased. The junction of the resistors 131 and 132 is more negative or less positive when the oscillator is fast. This slows down the rate of discharge of the oscillator grid condenser 118. When the oscillator frequency is lower than its desired frequency for synchronized deflection, substantially the entire width of each pulse 44*a* is effective to cause the tube 121 to draw plate current. The junction of the resistors 131 and 132 is then more positive which causes the frequency of the oscillator to increase. Because of filtering action, the oscillator will stabilize at the desired frequency for synchronized deflection.

What is claimed is:

1. In a television system, a source of sync signals, said sync signals being in the form of pulses, means including an oscillator for generating a voltage of sawtooth wave form, means for converting said sawtooth voltage wave to a partial parabolic waveform, means comprising a condenser for flattening the peaks of the partial parabolic waveform, means to combine said sync signals and said flattened parabolic wave directly, means responsive to said combining means for producing a frequency control voltage, and means to apply said frequency control voltage to said oscillator, whereby to effect synchronism of said oscillator with said sync signals.

2. In a television system, a source of sync signals, a sawtooth wave voltage source, means to convert said sawtooth wave to a wave having a flattened parabolic wave form, the peaks of which each have a declining side, a vacuum tube in which said sync signals and said flattened parabolic voltage wave are combined in additive relationship to produce a combined signal, means to render said tube responsive to said combined signal, and means for producing a unidirectional frequency control voltage from the output of said vacuum tube, whereby to effect synchronism of said sawtooth wave voltage source with said sync signals.

3. In a television system, wave generating means having a sawtooth output wave form, means to convert said sawtooth wave form to a parabolic wave form having flattened recurrent peaks, a source of sync signals, said sync signals being in the form of pulses, means to combine said sync signals and said parabolic wave form additively, a vacuum tube, means whereby said tube is responsive to the combined signal, said vacuum tube having a cathode circuit, means in said cathode circuit for producing a control voltage, an oscillator, means for controlling the sawtooth wave generating means from said oscillator, means for deriving a self bias for said vacuum tube, means to apply said control voltage to said oscillator to control the frequency thereof, said cathode circuit including a series combination of a resistance and a condenser, said cathode circuit also including a shunting condenser, the series combination of the resistance and condenser and said shunting condenser serving as a filter.

4. A deflecting circuit having an oscillator, a tube for providing a signal for controlling the frequency of said oscillator in response to a comparison of sync signals and a wave form derived from said oscillator, said tube having a cathode, an anode and a control grid, means to apply sync signals and the wave form derived from the oscillator on said grid, two resistors in series between said cathode and a voltage reference point in said circuit, a tapped grid resistor connected between said grid and the junction of said two resistors in said cathode circuit, means connected from said junction and to said oscillator for providing a frequency control voltage connection for said oscillator, a condenser connected from the tap on said grid resistor to said cathode, a series combination of a resistor and a condenser connected between said cathode and the voltage reference point with the resistor connected to the voltage reference point, and a capacitor connected from the cathode to the voltage reference point, whereby to effect synchronism of said oscillator with said sync signals.

5. A deflecting circuit having an oscillator, a tube for providing a signal for controlling the frequency of said oscillator in response to a comparison of sync signals and a wave form derived from said oscillator, said tube having a cathode, an anode and a control grid, means to apply sync signals and the wave form derived from the oscillator to the elements of said tube, two resistors in series between said cathode and a voltage reference point in said circuit, a grid resistor connected between said grid and the junction of said two resistors in said cathode circuit, means connected from said junction and to said oscillator for providing a control voltage connection for said oscillator, a series combination of a resistor and a condenser connected between said cathode and the voltage reference point with the resistor connected to the voltage reference point, and a capacitor connected from the cathode to the voltage reference point.

6. A deflection circuit having a blocking oscillator tube provided with a control grid, a control tube, means to apply a voltage wave form from the oscillator grid to said control tube, means to apply sync signals to said control tube, said means applying a voltage wave form from the oscillator grid serving also to apply a control signal from said control tube to said oscillator.

7. In a television system, an oscillator, means associated with said oscillator having a sawtooth output wave form, a source of sync signals, said sync signals being in the form of pulses, means to combine said sync signals and said sawtooth, means comprising a vacuum tube to produce a control voltage for synchronizing the frequency of said oscillator with that of said sync signals, means whereby said means comprising a vacuum tube is responsive to said combining means, means for providing operating bias for said tube comprising a cathode resistor connected in the cathode circuit of said tube, a grid resistor, a condenser connected from a tap on said grid resistor to the cathode of said tube, said grid resistor being connected to a tap on said cathode resistor, and means including the cathode circuit of said tube to apply said control voltage to said oscillator, whereby to effect synchronism of said oscillator with said sync signals.

References Cited in the file of this patent

UNITED STATES PATENTS

| | | |
|---|---|---|
| 2,201,978 | Bedford | May 28, 1940 |
| 2,212,648 | Poch | Aug. 27, 1940 |

| | | |
|---|---|---|
| 2,235,131 | Wheeler | Mar. 18, 1941 |
| 2,255,403 | Wheeler | Sept. 9, 1941 |
| 2,277,000 | Bingley | Mar. 17, 1942 |
| 2,280,990 | White | Apr. 28, 1942 |
| 2,332,681 | Wendt | Oct. 26, 1943 |
| 2,368,449 | Cook | Jan. 30, 1945 |
| 2,458,367 | Fyler | Jan. 4, 1949 |
| 2,510,027 | Torsch | May 30, 1950 |
| 2,633,538 | Tourshou | Mar. 31, 1953 |